Sept. 15, 1931.   H. HALPERIN ET AL   1,823,140
SHEATH BONDING SYSTEM
Filed April 5, 1930
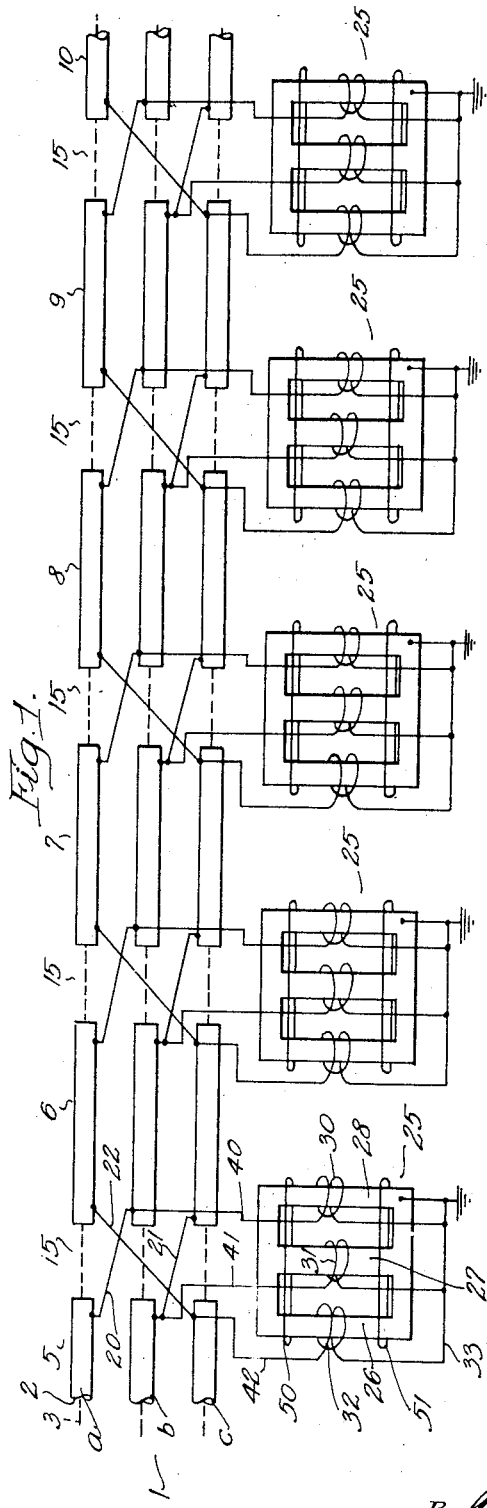
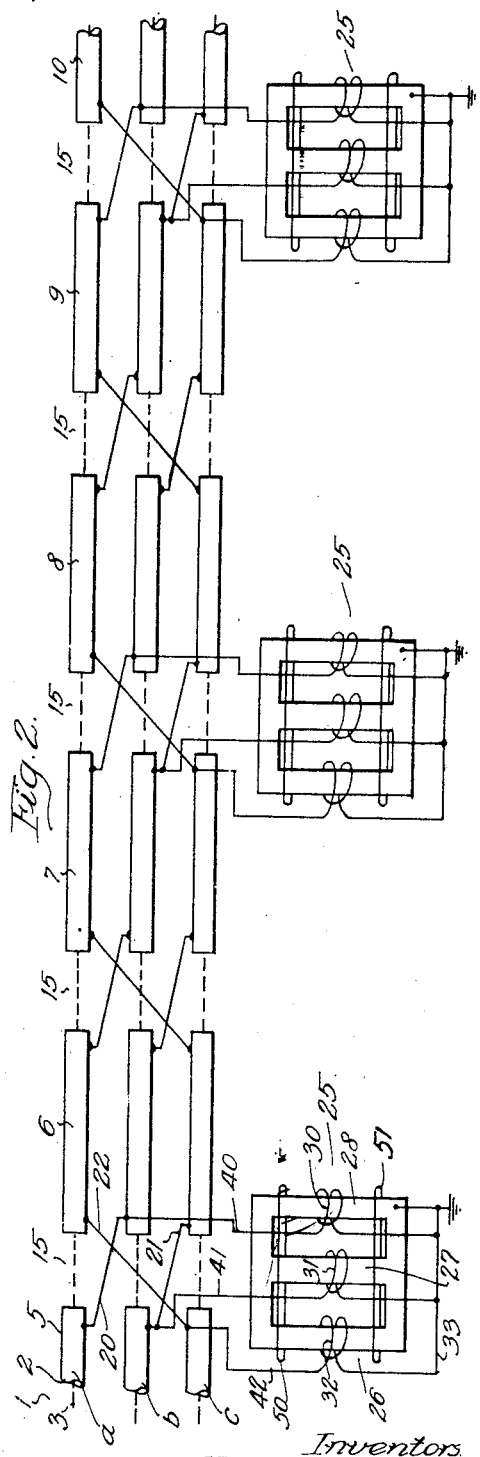
Inventors.
Herman Halperin
Kenneth W. Miller Patented Sept. 15, 1931

1,823,140

UNITED STATES PATENT OFFICE

HERMAN HALPERIN AND KENNETH W. MILLER, OF CHICAGO, ILLINOIS

SHEATH BONDING SYSTEM

Application filed April 5, 1930. Serial No. 441,906.

This application is a continuation in part of our application Serial No. 236,634, filed November 30, 1927.

Our invention relates to sheath bonding and is more particularly concerned with the bonding of sheaths of underground transmission cables, especially single phase cables of a three-phase transmission system.

It was formerly the practice in the underground three-phase transmission of alternating currents to place the three conductors in a single cable but as the values of the voltages and currents increase, in accordance with modern practice, this often becomes impracticable. This resulted in the adoption of a method in which the conductors are placed in separate cables, which are placed in suitable conduits under ground. These cables are arranged substantially parallel and, of necessity, are not placed very far apart. In this arrangement several very serious objections arise, due to induced sheath voltages or currents.

When alternating currents flow in the conductors of single conductor cables, there is induced a voltage in each sheath, and this voltage is directly proportional to the current and the length of each section of cable sheath between the manholes. If the sheaths of the three cables are connected by the ordinary method, which is solid bonding in each manhole, then this induced voltage causes a large current to flow in the sheath, with resultant heat losses that considerably reduce the current carrying capacity of the cable; for instance, about twenty-five per cent on single-conductor 750,000 C. M. cables operating at 66 k. v., 3-phase, 60-cycle in ducts on six-inch centers. If, however, the sheath lengths are made discontinuous by insulating joints and are specially connected by bonds or impedances, the flow of current may be prevented in the sheaths or greatly restricted, and the sheath losses practically eliminated. In this case the induced sheath voltages are not consumed in producing sheath current and are therefore present on the sheath. Various methods have been proposed for connecting the discontinuous lengths of sheaths, some of which will be discussed.

One of the methods referred to is known as the cross-bonding method. This is, in effect, simply sheath transposition. In practice it has several disadvantages. It does not lend itself readily to irregular conduit lengths, such as exist particularly around stations. Normal sheath voltages to ground at the intermediate portions of a three-length unit are the full amount which is induced in one sheath and the corrosive effects of A. C. electrolysis on the lead sheath may be excessive. During short circuits, these induced voltages increase in proportion to the current, and may reach large values.

A second proposed method with which we are familiar employs single-phase iron-core reactors in series with the sheaths of single-conductor cables. In this case the circuit of the iron core is not closed. This is open to the objection that, during short circuits, when the current flowing would be several times normal, the voltage across the reactor would be correspondingly higher.

In a third method, which is an improvement of the second method above discussed, a single-phase iron-core reactor is connected in series with the sheaths of single-conductor cables and is grounded. In this third method, however, the core of the reactor is designed with a closed iron circuit so proportioned as to approach magnetic saturation under normal conditions. As a result, during flow of abnormal currents such as occur during short circuits, the core becomes saturated permitting a large amount of current to flow through the reactor thus limiting the voltage across the reactor, this voltage usually being about three times normal value. This eliminates, to a large extent, the possibility of dangerously high voltages existing on the cable sheaths, which might cause holes to be burned in the sheath of the cable or shock a workman touching the sheath. In connection with the second and third methods, the reactor coil may be grounded at its midpoint thus reducing the normal operating sheath voltage to ground to one-half the total amount induced in the sheath of one cable length. This reduces by at least fifty per cent the danger of trouble from A. C. electrolysis effects.

While this third method is an improvement over the first and second methods above discussed, it is open to several objections, the most serious of which is that during the flow of failure currents returning back to the station through the lead sheaths and reactors, the coil voltages are added in series to the voltage drop along the sheath, and the resultant voltages are unnecessarily large. Also during normal operation and failures, due to the single phase arrangement of reactance coils having iron cores, triple harmonic currents are introduced into the sheath circuit which may produce objectionable inductive interference with telephone and like circuits. A further objection is the necessity of providing a separate reactor for each phase, and the coils of these reactors are rather large and expensive, both of which factors add very materially to the cost of this method.

It is one of the objects of the present invention to provide an arrangement for preventing or reducing sheath losses in single-conductor cables which arrangement will include the advantages of the third method, as well as other advantages, and which will not be subject to the disadvantages present in that method. We accomplish this by cross-bonding the cable sheaths and connecting thereto a three-phase transformer of a novel construction. This transformer is provided with three parallel legs in a closed magnetic circuit, the three legs each supporting one primary coil. The coils are connected in star, the neutral point of which is preferably, although not necessarily, grounded. There is provided a low resistance low impedance secondary which is delta connected. The secondary may be wound in the usual manner if desired, each coil thereof being of very few turns. A cheaper method is to place a bar of copper around each end of the transformer, each bar constituting a single short circuited coil embracing all three legs of the transformer. These transformers may be located at or near each of the transposition points or they may be located anywhere between transposition points. The primaries are connected to the respective sheaths of the three cables comprising the three phases of the transmission system. A separate transformer may be provided for each section of the cable, or for alternate sections, or one transformer may be provided for every "$m$th" where "$m$" is any whole number not divisible by 3, in a three-phase system.

By a continuous cross bond connection of the cable sheaths and star connection of the transformers a reduction in the induced sheath voltages between cable sheaths and to ground is accomplished by our invention without introducing sheath losses. This is because the cross bonding of the sheaths establish three independent sheath circuits each of whose induced voltages are equivalent to a delta connection, that is the voltage vectors repeatedly trace (approximately) equilateral triangles. The star transformer connection causes the voltage triangles for the three sheath circuits to be superimposed and the ground to be established at the center of the triangle. Therefore, our invention accomplishes a desirable reduction in sheath voltages approximately forty percent less than the voltages existing between sheaths and between sheaths and ground for some of the connections at present known to the art. Theoretically, the reduction for equilateral spacing of cables is in per cent equal to one hundred times the difference between one and one over the square root of three, that is, 42.3%. Minimum sheath voltage is highly desirable to reduce possibility of sheath corrosion and to avoid other practical disadvantages.

The normal three-phase reactance of the primary coils is high, only a small exciting current flows, and the losses are negligible. The secondary coils function normally only as a tertiary winding preventing the flow of triple harmonic current in the sheaths.

When there is a line failure, the single phase failure current divides in the first transformer or two adjacent to the failure. Part of the current will flow through the neutral connection of these coils and back to the station over independent parallel ground paths, if such paths are available. The remaining portion of current, having divided about equally in the transformers adjacent to the failure, will return in parallel over the three sheath circuits without having to pass through any impedance other than the cable sheaths and cross-bond connections in series. Furthermore, at any locations remote from the failure approximately equal currents may enter or leave the three sheath circuits, flowing through the three primary windings of any transformer in parallel and through the neutral connection. This allows the return failure current to avail itself of any and all ground circuits paralleling any part or all of the line (such as the sheaths of other cables in the same ducts). Because of the closed secondary winding the device behaves exactly as a short circuited transformer for parallel flow of single phase current through the primary coils under these conditions. This is because the series reactance is due to leakage flux only (not saturation flux) with the result that the reactance drop across the device is minimum in value. Consequently in the case of single phase cable failure current returning along the sheaths, the transformers provide the maximum possible number of connections for parallel return paths and the minimum amount of impedance in these paths. This results in minimum overall impedance of the return current path and minimum possible abnormal voltage drop along the sheath circuit.

Stray direct currents flow according to the resistance of the sheath circuit, and divide about equally in the three coils. The D. C. flux is in parallel in the three legs of the iron core and must return through an air path and cannot, therefore, strongly polarize the iron core. Thus these stray direct currents flowing through the transformers will have no undesirable effects on the A. C. characteristics. Also, the transformer coils present very small resistance to the flow of direct current, and introduce no complications into D. C. electrolysis mitigation. The three-phase transformer allows economy in size, place, and convenience of installation.

To summarize, a system connected as above has the following characteristics: Reduced sheath voltages, high three-phase impedance, minimum single-phase impedance, very low losses, practically no sheath current harmonics, no interference with stray D. C. flow or electrolysis mitigation, and economy of installation.

The attainment of the above and further objects of the present invention will be apparent from the following specification taken in conjunction with the accompanying drawings forming a part thereof.

In the drawings:

Figure 1 is a schematic circuit diagram of a portion of a system arranged in accordance with our invention; and Figure 2 is a similar circuit diagram of a slightly modified arrangement.

Reference may now be had more particularly to Figure 1 wherein we have shown our invention applied to a three-phase system. It is however to be understood that the present invention is not limited to such a system, but is equally applicable to systems of any other number of phases. A three-phase transmission system employing single-phase sheathed cables is indicated at 1. Each of the cables comprises a sheath 2 and a conductor 3. The sheaths of each cable are divided into sections insulated from one another and of a length preferably equal to the distance between manholes. The sections are indicated at 5, 6, 7, 8, 9 and 10, the respective sections being insulated from one another by suitable joints at 15. As stated above each sheath section usually extends from one manhole to another, the insulated joints being located in the manholes in the customary manner, although the joints may also be located at other points if required. At each of the insulated joints the cable sheaths are connected by cross-bonding. The sheath of the "a" phase of one section is connected by a conductor 20 to the sheath of the "b" phase of the adjacent section; the sheath of the "b" phase of one section is connected to the sheath of the "c" phase of the adjacent section by means of a conductor 21; and the sheath of the "c" phase of one section is connected to the sheath of the "a" phase of the adjacent section by a conductor 22. This cross-bonding is repeated at each of the manholes where an insulating joint, such as 15, is located.

In each of the manholes where an insulating joint 15 is located we provide a transformer 25. Each of the transformers is provided with three parallel core legs 26, 27, and 28 in a closed magnetic circuit. Three primary windings 30, 31 and 32 are provided for the respective core legs. The three primary windings are connected in star by means of a conductor 33 which is preferably, although not necessarily, grounded. The grounding connection may be obtained by connecting the conductor 33 to the sheath of some conductor that may be located in the proximity of the conductors of the line 1. The iron core of the transformer 25 is also preferably grounded. The opposite ends of the primaries 30, 31 and 32 are connected to the respective cable sheaths of the cables "a", "b" and "c" by means of conductors 40, 41 and 42. The transformer 25 is provided with two secondaries indicated at 50 and 51, respectively. Each of these secondaries may comprise merely a bar of copper wound around the entire core in the form of a single closed loop. If desired, each of the secondaries may take the form of a two-piece clamp which is clamped together and serves to hold the laminations of the iron structure of the transformer together. While we have herein shown the secondaries as comprising a single turn wound around all three legs of the transformer core this is optional. If desired, a wound secondary may be used. The wound secondary would have one or more turns around each of the core legs 30, 31 and 32, said three windings being connected in delta. The secondary is preferably made of very low resistance and of very low reactance.

In Figure 2 we show a system which differs from Figure 1 only in that the transformers are located in the alternate manholes rather than in each manhole, assuming that the cable sheaths are cross-bonded in each manhole. In either of these forms of our invention the transformers are spaced at approximately equal intervals along the line. The transformers may be installed in every manhole, in every second manhole, or in every fourth manhole. They should not, however, be connected at intervals which are a multiple of three cable lengths in a three-phase system, or, in a system of a number of phases other than three they should not be connected at intervals which are a multiple of the number of phases of the system, because with such a connection the vector triangles have the ground point shifted over to the corner, instead of being fixed at the center. If the transformers are connected at too great an interval, the voltages during normal operation will not be sufficiently controlled, furthermore impedance drops may be excessive during failure because of the fact that the returning current must travel on one sheath circuit for a considerable distance before it can divide at a transformer. Under practical conditions every second manhole appears to be the most desirable interval in a three-phase system.

It is evident that during normal operation, three-phase sheath voltages are applied to the transformer primaries and the vector summation of the voltage in the delta connected secondaries is zero. Therefore during normal operation no current will flow in the secondary windings and the current flow in the primary coils will be limited to exciting current necessary to establish the flux which is required to cause an induced voltage equal and opposite the applied or sheath voltage. As is well known this exciting current is small. It can easily be seen that the normal operation of our present invention is identical to that of an ordinary three-phase transformer bank with no load on the delta connected secondary.

During failures either one or both of two different effects may be produced. First, the conductor currents may become unbalanced due to the current flowing out to the failure and as a result the induced sheath voltages applied to the transformers become increased in magnitude and distorted in phase. Secondly, the returning failure current will return to the station end of the line all or in part over the sheaths of the cables and also may divide over independent ground paths by flowing through the primary coils and the grounded neutral connection of the transformers, where such additional parallel return paths may exist.

It is well known that the voltage induced in the secondary of a transformer is almost exactly proportional to the voltage applied to the primary. Now the applied voltages which are induced in the cable sheaths by currents in the copper conductors are directly proportional to the conductor currents. Therefore, if during failure the vector summation of conductor currents is not zero, then the vector summation of voltages induced in the delta connected secondaries of the transformers is not zero and the secondary acts as a short circuited winding for that amount of voltage by which the vector triangle fails to close. Since the short circuit impedance of a transformer can be made very low, the impedance drop for the unbalanced component of the sheath voltage will be very low and large induced currents will flow in the sheaths. These currents will consume the unbalanced component of induced voltage in the sheaths and neutralize it where it is generated.

Normal sheath voltage at full load is usually about 10 volts per cable length and short circuit currents seldom exceed 10 times normal full load value so that a votage of 50 to 100 volts between cable sheaths and ground would seldom be exceeded. Temporary sheath voltages of this value are harmless and inconsiderable in comparison with cumulative voltages along the cable sheath circuit which could result from the vector resultant of unbalanced copper currents already described or returning failure current about to be described.

Failures between phases not involving failure to ground are not frequent and in many cases are impossible on single conductor cable lines.

The returning failure current is most important from the standpoint of sheath voltages during abnormal conditions. Single conductor cable lines are often installed in isolated conduits which may be quite dry. In such cases the failure current is forced to return long distances toward the terminal station over the cable sheaths of the line in trouble. Since the sheath impedance voltage drop is cumulative along the line it is very important that the sheath bonding connection present a small impedance to such return currents. With our invention after current division in the transformers adjacent to the failure, no impedance is added to that of the cable sheaths and bond wires of the sheath circuit itself.

Necessarily the return current from a phase to ground failure must be single-phase in value. The action of the transformer adjacent the fault is exceedingly complicated and need not be discussed in this application. Suffice it to say that current will flow from the cable sheath at the fault through the corresponding coil of the transformer and will divide through the other two coils and will travel back along the three sheaths of the three cables. Also in these coils some current will flow through the neutral to ground or to additional parallel paths, if present. At the next and the subsequent manholes where the transformers are located current will flow out through all three of the transformer coils in the same direction to other return ground circuits if present. Otherwise these transformers will not be in the return circuit at all. There will thus be a transformer action in all transformers handling single phase or unbalanced currents. Due to the very low resistance of the secondary large secondary current will flow in such cases, thus greatly reducing the reactance of the primary windings. This action is similar to what takes place in a short-circuited current transformer.

Thus it may be seen that we have provided an arrangement which will prevent the flow of large three-phase sheath currents during normal operation but will permit returning failure current to pass in any direction practically without obstruction and furthermore it will act as a short circuit to any cumulative induced sheath voltage. Otherwise stated the combination acts as a variable valve allowing heavy current to pass during abnormal conditions but preventing appreciable current flow during the normal operation.

Also, as is well known, triple harmonic exciting current can flow in the delta connected secondary and therefore will not be present in the sheath circuit where it might give trouble by inductive interference with telephone cables in parallel conduits. Since all these effects are exactly those desired in operation, the transformer combination is ideal for the purpose of sheath bonding.

It is obvious that the scheme is applicable to single phase, two, four or six phase circuits or in fact any circuit with two or more cables and in the above description and in the following claims, we do not intend to limit ourselves to the common three-phase arrangements shown.

In order to withstand the large temporary current that may flow during failures, it is necessary to use copper of large cross section for the coils. For thermal and electrical reasons it is advisable to make the total cross section of the secondary winding about the same as the primary.

In compliance with the requirements of the Patent Statutes, we have herein shown and described two preferred embodiments of our invention. The invention is however not limited to the precise arrangement herein shown, the same being merely illustrative.

What we consider new and desire to secure by Letters Patent is:

1. An electric power system including a plurality of spaced sheathed cables, the sheaths being divided into a number of spaced insulated lengths and connected together by cross-bonding, and means at the alternate insulating points electromagnetically interlinking the sheath sections of all of the cables.

2. An electric power system including a plurality of spaced sheathed cables, the sheaths being divided into a number of spaced insulated lengths and connected together by cross-bonding, and transformers having their primaries connected to the respective cable sheaths of the different cables and the secondaries connected in a closed loop.

3. An electric power system including a plurality of spaced sheathed cables, the sheaths being divided into a number of spaced insulated lengths and connected together by cross bonding, and transformers having their primaries connected to the respective cable sheaths of the different cables at alternate insulating points.

4. A polyphase electric power system including a plurality of spaced sheathed cables, one for each phase, each of the sheaths being divided into a number of spaced insulated lengths and connected together by cross-bonding, and means at the alternate insulating points for controlling the potential of the sheaths.

5. An "$n$" phase electric power system where "$n$" is any whole number, said system including a plurality of spaced sheathed cables, one for each phase, each of the sheaths being divided into a number of spaced insulated lengths and connected together by cross-bonding, and means at every "$m$th" length for controlling the potential of the sheaths, "$m$" being any whole number greater than unity and prime with respect to "$n$".

6. An "$n$" phase electric power system where "$n$" is any whole number, said system including a plurality of spaced sheathed cables, one for each phase, each of the sheaths being divided into a number of spaced insulated lengths and means at every "$m$th" length for controlling the potential of the sheaths, "$m$" being any whole number greater than unity and prime with respect to "$n$".

7. In a polyphase system, separate sheathed cables for the respective phases each cable sheath being divided into a plurality of short sections insulated from one another, cross-bonds between the sheaths, high reactance means connecting the respective sections of the cables to ground, and means effective upon the occurrence of an unbalanced condition between the respective sheaths for reducing the reactance of said first means to a negligible value.

8. In a three-phase system, three separate sheathed cables, one for each phase, each of the cable sheaths being divided into sections insulated from one another, cross-bonding between the sheaths, electromagnetic means for electromagnetically interlinking the sheath circuits, and means ineffective during normal operation and initially effective upon the occurrence of unbalanced conditions in the respective sheath circuits for appreciably reducing the impedance of the electromagnetic means.

9. In a three-phase system, three separate sheathed cables, one for each phase, each of the cable sheaths being divided into sections insulated from one another, cross-bonding between the sheaths, electromagnetic means for electromagnetically interlinking the sheath circuits, said means comprising coils conductively interconnected, and means ineffective during normal operation and initially effective upon the occurrence of unbalanced conditions in the respective sheath circuits for appreciably reducing the impedance of the electromagnetic means.

10. In a three-phase system, three separate sheathed cables, one for each phase, each of the cable sheaths being divided into sections insulated from each other, the sections being connected together by cross bonding, means having a comparatively high reactance under normal conditions for interconnecting the sheaths and means effective upon the occurrence of an unbalanced condition between the respective sheaths for reducing the reactance of said means to a negligible value.

11. A three-phase sheathed cable transmission system the sheaths of the cables being separated into lengths electrically insulated from each other and connected together by cross-bonding, and means for providing an artificial neutral for the sheath lengths between the insulation points, said means comprising a polyphase transformer the primaries of which are connected in star and to the cable sheaths, and the secondaries of which comprise a closed loop.

12. A three-phase power transmission system wherein there are provided separate sheathed cables for the respective phases, each sheath being divided into sections insulated from one another, and the sections of the sheaths of the three conductors being connected in transposed relation so that the induced voltages in the serially connected sheaths act to oppose each other and to normally prevent the flow of current, and wherein there is connected between ground and the respective sheaths, at spaced points, magnetic coils having a high impedance, characterized in that there is provided means normally ineffective and effective under abnormal conditions for reducing the reactance of the coils to a negligible value.

13. In a three-phase power transmission system wherein there are provided separate sheathed cables for the respective phases, each sheath being divided into sections insulated from one another, and the sections of the sheaths of the three conductors being connected in transposed relation so that the induced voltages in the serially connected sheaths act to oppose each other and to normally prevent the flow of current, and wherein there is connected between ground and the respective sheaths, at spaced points, magnetic coils having a high impedance, the method of controlling sheath currents which comprises reducing the impedance of the coils to a negligible value upon the occurrence of unbalanced abnormal conditions.

14. In a three-phase power transmission system wherein there are provided separate sheathed cables for the respective phases, each sheath being divided into sections insulated from one another, the method of controlling the sheath currents and voltages which comprises opposing the voltage induced in one section by the voltages induced in the sheath sections of the other two phases, whereby the normal resultant total voltage is substantially zero, forcing triple harmonics and unbalanced three-phase voltages that may exist between sheath lengths to dissipate themselves over a predetermined low impedance path, and preventing balanced three-phase voltages on the respective sheath sections from producing a current flow over said path.

15. In combination with the cables of a multiphase transmission system, the sheaths of said cables being separated into lengths electrically insulated from each other and connected in transposition by cross-bonding, a transformer having its primary coils connected at one end to the respective sheath lengths and connected together and grounded at their other end, the secondary coils of the transformer being connected in a closed circuit.

In witness whereof, we hereunto subscribe our names this 4th day of April, 1930.

HERMAN HALPERIN.
KENNETH W. MILLER.